United States Patent [19]
Ginsberg

[11] 3,894,438
[45] July 15, 1975

[54] PNEUMATIC FLUID LEVEL SENSING AND SAMPLING SYSTEM

[75] Inventor: Guenter Ginsberg, Miami, Fla.

[73] Assignee: Coulter Electronics, Inc., Hialeah, Fla.

[22] Filed: July 27, 1973

[21] Appl. No.: 383,464

[52] U.S. Cl. .............................................. 73/423 A
[51] Int. Cl. .............................................. G01n 1/14
[58] Field of Search.......... 73/421, 423 A; 23/259 R; 210/83, 513; 137/804, 805, 842

[56] References Cited
UNITED STATES PATENTS

| | | |
|---|---|---|
| 3,429,323 | 2/1969 | Mott .................................. 137/842 |
| 3,494,191 | 2/1970 | Cawley .............................. 73/290 R |
| 3,635,094 | 1/1972 | Oberli ............................... 73/423 A |
| 3,754,444 | 2/1973 | Ure et al. .......................... 73/423 A |

Primary Examiner—S. Clement Swisher
Attorney, Agent, or Firm—Silverman & Cass, Ltd.

[57] ABSTRACT

A pneumatically responsive level sensor controls the positioning and sampling action of a sampling probe. The sensor and probe are moved synchronously, with the sampling probe extending into the sample at the time that the level sensor reaches the surface of the sample. The level sensor actuates a fluidic turbulence amplifier, which triggers a pneumatic-electric switch, for providing various sampling, positioning, and pneumatic activities.

13 Claims, 1 Drawing Figure

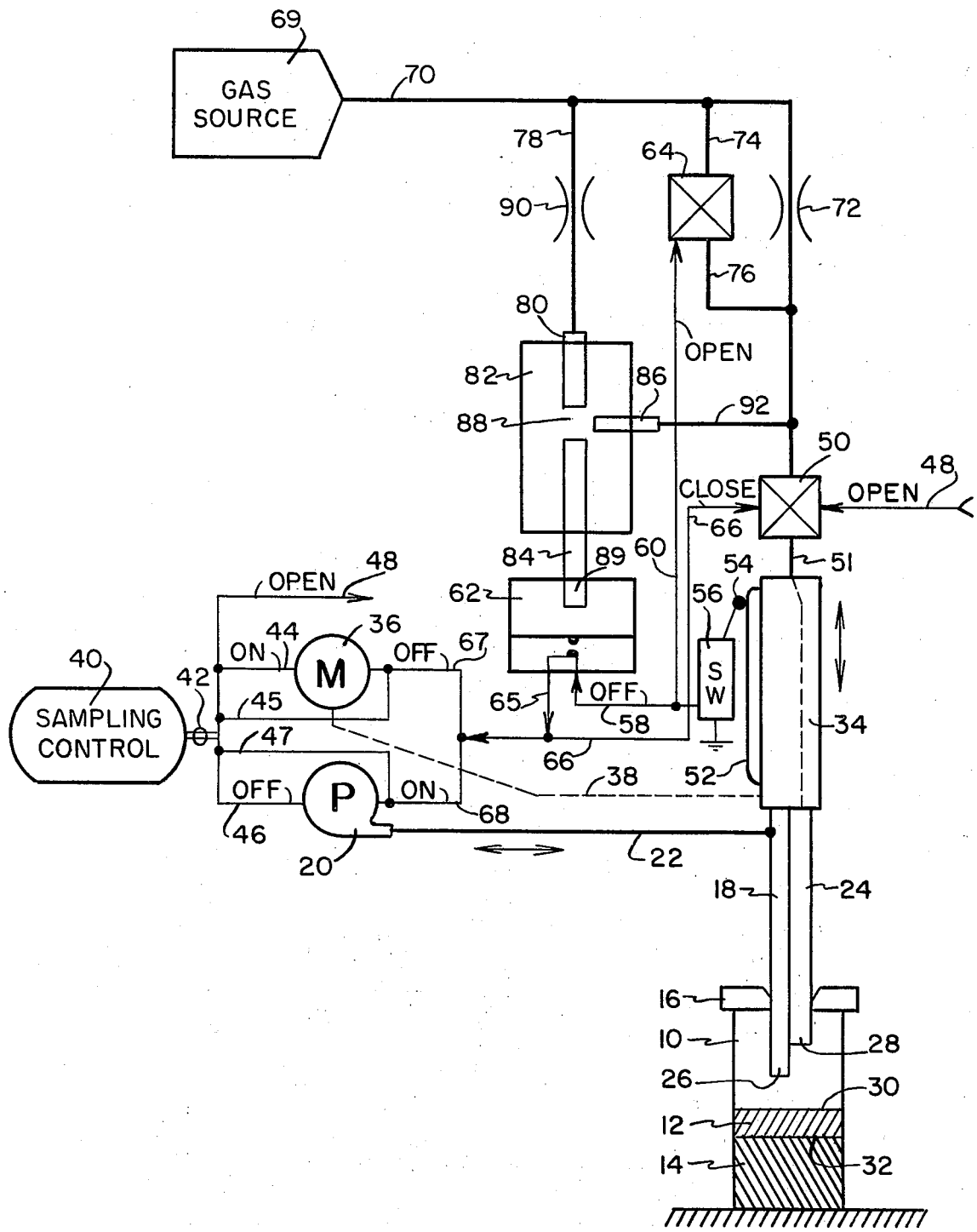

PNEUMATIC FLUID LEVEL SENSING AND SAMPLING SYSTEM

BACKGROUND OF THE INVENTION

This invention concerns a sample level sensor and sampling system and is useful in, but not limited to, the sensing of the level of a liquid in a small container and the removal of an aliquot thereof from the container.

The prior art is filled with numerous forms of level sensors and samples and no attempt will be made herein discuss the prior art, except to point out that specific problems arise when it is desired to remove an aliquot of sample by suction or aspiration. Typically, the sampling probe, pipette or the like is moved relative to the surface of the sample until the probe tip is well immersed, the aliquot then is drawn up into the probe and lastly the probe is removed from the sample for subsequent transfer of the aliquot to another container or the like. Some of the problems which may arise is that the probe is not immersed, is not immersed enough, or is immersed too deeply into the sample to obtain the desired sampling.

If the probe is not immersed or the suction action commences prior to immersion, the aliquot might contain undesirable air bubbles or be lacking in proper volume. Similarly, if the probe is immersed only slightly below the upper level of the sample, such that the removal of the desired volume of the aliquot will cause the sample level to drop below that of the input tip of the probe, an insufficient volume of aliquot will be obtained and air will be drawn into the probe. If the sample is stratified, due to different specific gravities, densities, etc. of the constituent parts of the sample, the depth of immersion of the sampling probe will determine which of the constituent parts will be sampled. If an improper depth of probe is attained, either the wrong constituent part, or portions of two constituent parts could be sampled.

The prior art has employed level sensors which respond to electrical parameters, such as conductivity, resistance, and capacitance. One drawback to such forms of sensors lies in the fact that residual sample, or inadvertent or presence contact of other environmental substances can generate premature or otherwise false detection of a sample level.

Another problem faced by prior art samplers is the presence of sample carryover from aliquot to aliquot and thereby from sample to sample, by virtue of a small amount of an aliquot adhering to the outside of the probe during and after removal from the sample. Such carryover can cause intersample contamination as well as cause small but statistically significant volume differences in the aliquots.

SUMMARY OF THE INVENTION

The apparatus of the present invention seeks to reduce the problems found in prior art level sensing and sampling arrangements. Provided is a probe having two tubes, one for sampling and the other for level sensing, that are positioned side by side and moved as a unit toward the sample. The sampling tube extends a predetermined distance below the sensing tube, the later emitting a stream of air toward the surface of the sample. Pneumatically coupled to the sensing tube is a fluidic turbulance amplifier. When the sensing probe tip is lowered to the sample surface, there is a back pressure in that probe which causes a reaction in the amplifier. The latter is coupled to a pneumatic-electric switch that then is closed to deactivate the lowering of the sampling tube, commence a drawing up of the aliquot, turning off of the air flow from the sensing probe tip, and other desired functions. When the aliquot volume is drawn into the sampling probe, suitable controls act to remove the probe and turn back on the air flow so as to blow off any residual sample from the sampling probe tip.

BRIEF DESCRIPTION OF THE DRAWING

The drawing is a diagram of an embodiment of the invention in an exemplary environment.

DESCRIPTION OF A PREFERRED EMBODIMENT OF THE INVENTION

The FIGURE illustrates diagrammatically a liquid level sensing and aliquot withdrawing; i.e., sampling system for obtaining a precise volume of a sample from a container 10. The sample is shown to consist of two constituent parts, an upper part 12 and a lower part 14. It is desired to obtain a small volumed aliquot, such as twenty-five microliters of the constituent upper part 12, for transfer to another location, not shown. The container 10 can be provided with a cover 16, which is pierced by means not illustrated, just prior to the sampling process. Sampling is accomplished by a probe 18, such as a pipette, which draws up the aliquot by virtue of some form of pumping apparatus, which is simply illustrated as a pump "P" 20 coupled to the sampling probe 18 by a conduit 22. The communication via the conduit 22 is in both directions, as illustrated by an adjacent two-headed arrow, since the aliquot subsequently is to be discharged from the probe 18 for processing.

A level sensing probe 24 is provided alongisde the sampling probe 18. The probes need not lie parallel to one another as illustrated; however, they both have ends, 26 and 28 which terminate at two different levels with respect to the upper surfaces, respectively, 30 and 32 of the two constituent sample parts 12 and 14. Since the desired aliquot is to be from the sample part 12, and the sensing probe end 28, as next to be described, will be lowered to the upper surface 30 of the sample part 12, the level difference between the probe ends 26 and 28 cannot exceed the level difference between the sample part surfaces 30 and 32 and should be sufficiently less so that none of the sample part 14 will be drawn along with the aliquot from the sample part 12. Yet also, the level of the sampling probe end 26 must be lower than the end 28 of the sensing the 24 by a distance sufficient to ensure that the level of the surface 30 will not drop below the level of the end 26 during withdrawal of the aliquot, or a succession of aliquots, if that is the desired process.

The two probes 18 and 24 are arranged to be lowered into and raised from the container 10 synchronously. Such relative and synchronous movement can be accomplished in various ways by mechanisms well within the skill of the art. A probe transport 34 into which both probes are received and which is capable of controlled reciprocation, as by a rack and pinion drive (not shown) can accomplish the necessary up and down motion, as illustrated by the adjacent double-headed arrow. A motor 36 supplies the motive power to the probe transport by linkage illustrated generally by a dashed line 38.

The direction of motion, the turning on of the motor 36, the direction of sample movement via the pump 20 and the turning off of the pump can be directed by a processing center which includes a command operation entitled Sampling Control, and is represented in the FIGURE by that symbol and its reference number 40.

A command output cable 42 of the Sampling Control is branched off into five control lines 44, 45, 46, 47 and 48. The line 44 supplies power to the motor 36; the line 45 turns off the motor; the line 46 removes power from the pump 20; the line 47 turns the pump on; and the line 48 is coupled to a valve 50, such as a solenoid valve, for controlling its opening and the passage of gas into the sensing probe 24 via a conduit 51.

The probe transport 34 carries a cam 52 which passes in front of a cam follower 54 that operates a microswitch 56, depending upon the relative position of the probes 18 and 24 to the container cover 16. While the ends 26 and 28 of the probes 18 and 24 are in a position anywhere from a short distance above to a short distance below the container cover 16, the cam 52 will force against the follower 54 and cause the switch 56 to be operated to provide a control signal on a pair of output lines 58 and 60. The output line 58 is coupled electrically to an input of a pneumatic-electric switch 62 for disabling that switch during the time that the probe ends 26 and 28 are proximate the container cover 16. The output line 60 electrically is coupled to a valve 64, such as a solenoid controlled valve, to open that valve when the probe ends are proximate the container cover. The pneumatic-electric switch 62 has an electric output on a line 65 which, when energized, feeds into three branch lines 66, 67 and 68 that are connected to close the valve 50, turn off the motor 36 and turn on the pump 20, respectively.

A source of gas 69 provides the needed pneumatic inputs. Its output is on a supply conduit 70 and can be relatively low, such as 5 p.s.i., which results in an output gas stream from the sensing probe end 28 that has a low flow rate of about 3 to 4 meters per second in the example embodiment. The supply conduit 70 passes through a restrictor or choke 72 on its way to the input of the valve 50. If, for example, the inside diameter of the conduit 70 is 1 mm (0.04 inch), the restrictor 72 would be 0.15 mm (0.006 inch) to suit the needs of the example embodiment. Branch conduits 74 and 76 couple the valve 64 to the supply conduit 70 and define a bypass around the restrictor 72. Thus, when the cam operated switch 56 opens the valve 64, the restrictor 72 is bypassed and a greatly increased flow of gas is emitted from the probe 24 and serves to clean from the probe near its end 26 residual aliquot including any material that might be present aliquot the cover 16 and might collect on the sampling probe near its end 26 as it passes through the cover.

A conduit 78 couples gas flow from the supply conduit 70 to the input port 80 of a fluidic turbulence amplifier 82, which has an output port 84 and a control or gate input port 86. Such turbulence amplifiers are commercially available, one source being the Agastat Division of Amerace — Esna Corporation, Elizabeth, N.J. A turbulence amplifier is somewhat like an electric triode tube or transistor in that gas flow from the input port 80 to the output port 84 is influenced by the crossflow of gas from the control port 86 into a gap 88 between the interior ends of the input and output ports. When a fine jet of gas is emitted through the control port 86 into the gap 88, the normal flow from the input port 80 toward the output port 84 is deflected and thereby is diminished such that the pneumatic signal output from the amplifier can be significantly varied by a relatively small change in the conditions expressed at the control port 86.

The output port 84 is coupled directly to the pneumatic input 89 of the pneumatic-electric switch 62 for controlling the electrical output therefrom. This switch is available commercially, for example, from clippard Instrument Laboratories, Inc., Cincinnati, Ohio. A restrictor 90 is interposed in the conduit 78, upstream of the amplifier input port 80. This restrictor, in the embodied example, would have a diameter of 0.30 mm (0.012 inch) and thus the amplifier receives four times more the gas flow than is passed from the restrictor 72 toward the level sensing probe 18 during normal sensing operation of the probe, but the amplifier 82 receives less than one tenth the gas flow passed through the bypass valve 64 toward the sensing probe during its sample probe cleaning operation. The control port 86 of the amplifier 82 is coupled by a conduit 92 to the supply conduit 70 and normally receives very little gas flow. When the bypass valve 64 is opened, the conduit 92 would receive an increased flow of gas; however, the resulting reaction by the amplifier 82 and the pneumatic-electric switch 62 is of no consequence, since at that time the output of that switch 62 is disabled electrically by action of the microswitch 56 and the inhibit signal on its output line 58.

The above described system can operate as follows, assuming a starting point at which the probe transport 34 has the probes 18 and 24 elevated far enough above the container cover 16 such that the bottom edge of the cam 52 is fully above the cam follower 54. At such starting position the gas source is assumed to be turned on, and remains on throughout the entire operation. The amplifier 82 is in its normally quiescent or passive condition, i.e. the switch 62 is off, which prevents the pump 20 from being on; there is no motor energizing signal on the line 44; the bypass valve 64 is closed; the valve 50 is open; and a normal stream of gas is being emitted from the end 28 of the sensing probe. Thereupon, the Sampling Control 40 issues a motor "ON" order along the line 44 and the motor 36 drives the probe transport 34 downward toward the container 10. When the transport carries the lower edge of the cam 52 past the cam follower 54, the micro switch 56 operates via the line 58 to inhibit any output from the pneumatic-electric switch 62, and via the line 60 opens the bypass valve 64 to commence a cleaning operation of the sampling probe end 26.

When the cam 52 moves below the cam follower 54, the starting point conditions are reobtained, except for the fact that motor 36 continues to drive the probes 18 and 24 toward the upper surface 30 of the sample part 12. Since the sampling probe end 26 extends below that of the sensing probe end 28, it will enter into the upper sample part 12 before the sensing probe end 28. When the sensing probe is just above the surface 30, the emitting stream of gas will be obstructed from freely flowing from the probe. The cause of the obstruction is due to the fact that there is insufficient room between the probe end 28 and the surface 30 for the gas to move as freely downward. Also, some of the gas will strike that surface 30 and be returned upward into the sensing probe end 28. As a result there will commence the generation of a back pressure in the sensing probe 24, the conduit 51, the valve 50, and the supply conduit 70 up to the conduit 92, which feeds into the control port 86 of the fluidic turbulence amplifier 82. Depending upon the rate of descent of the transport 34, the viscosity and surface tension of the sample part 12, the sensitivities of the amplifier 82 and the pneumatic-electric switch 62, and the gas pressures and flow rates at various points of the system, the back pressure will attain the necessary magnitude to cause the stream into the control port 86 to divert the normal input-output flow through the amplifier 82 to trigger the pneumatic-electric switch 62 at the time when the sensing probe end 28 is very close to or perhaps just touching the surface 30. Assuming the system parameters to be constant, the probe end 28 can be brought repeatedly to the precise same position relative to the surface 30 with a precise and rapid turning on of the electric output 65 of the pneumatic-electric switch 62.

The level sensing operation just described generates from the switch output line 65 a plurality of electric control signals on the lines 67, 66, and 68 which turn off the motor 36 and retain the sampling probe end 26 within the sample part 12, close the valve 50 to obviate any gas stream turbulence at the sample surface as well as ensure that the control input 86 continues to be fed enough gas to latch the switch 62 on, and turn on the pump 20 to draw a micro-aliquot into the sampling probe 18. When the aliquot volume is within the sampling probe 18, the Sampling Control 40, via the lines 46, 44 and 48, turns off the pump 20, turns on the transport motor 36 to raise the probes via the linkage 38, and opens the valve 50. When the upward moving cam 54 again trips the switch 56, as shown in the orientation in the FIGURE, the penumatic-electric switch 62 is disabled and the bypass valve 64 opened to clean the probe end 26 of residual aliquot. After the transport 34 raises the cam 52 above the cam follower 54, the switches 56 and 62 attain their quiescent state and normal gas flow is resumed throughout the system. Next, the Sampling Control 42 generates a command signal on the line 45 to turn off the transport motor.

Depending upon environmental needs, the aliquot within the sampling probe 18 can be emptied into a vessel (not shown) at the same location as the container 10, or at a different location. In the latter case, the transport 34 would need supplemental positioning means. The line 47 from the Sampling Control can be employed to turn on the pump to discharge the aliquot. Other portions of the system also can be energized to effect aliquot transfer, subsequent rinsing of the sampling probe and various routine procedures.

Although the example environment is for handling microsamples of a liquid, large or small volumes of liquids or dry substances could be the sample material. Also, the distance between the ends 26 and 28 of the probes could be sufficient for the aliquot to come from the sample part 14. Other variations and modifications could be made to the system to meet specific need; yet, the evolved system would remain within the spirit and scope of this invention. For example, rather than transport the probes to and from the sample container, the container can be seated on a transport mechanism or can be coupled to a transport means which would provide the relative movement as well as the cammed switching action.

What is sought to be protected by United States Letters Patent is:

1. A level sensing and sampling system comprising:
a sampling probe,
means coupled to said sampling probe to control its sampling operation,
a level sensing probe,
probe transport means coupled to provide relative movement to both said probes as if a unit with respect to a sample having an upper surface,
said probes being constructed and arranged relative to one another and oriented with respect to the sample surface such that there is a predetermined difference in distance between the sample surface and the proximate end of each of said probes, with the sampling probe end being disposed closer to the surface than the sensing probe end,
gas source means coupled to said sensing probe for supplying at least one quantum of gas pressure to said sensing probe for discharge from its said end toward the sample surface, and
gas pressure responding means having two input ports, one said port being coupled to said gas source means to receive input gas, and a second of said ports being coupled to receive and react to control gas effectively generated by said sensing probe at the time that and by virtue of said sensing probe end being moved by said transport means toward the sample surface when the gas discharge from said sensing probe end comes significantly under the influence of the presence of the sample surface, said sampling probe control means being responsively coupled to said gas pressure responding means for immobilizing said transport means and effecting sampling initiated by the reaction to the control gas.

2. A system according to claim 1 in which said gas pressure responding means includes a fluidic turbulence amplifier having one output, said output being coupled to respond exclusively to the input gas and the control gas applied to said two ports.

3. A system according to claim 2 in which said sensing probe, said gas source means and said fluidic turbulence amplifier are intercoupled such that the control gas is generated in the form of a back pressure from the sensing probe into a control port of said amplifier.

4. A system according to claim 3 in which said gas pressure responding means include a pneumatic-electric switch having a pneumatic input coupled to the output of said fluidic turbulence amplifier, and an electric output coupled to inputs of said sampling probe control means and said probe transport means.

5. A system according to claim 4 in which said system includes electric switching means coupled between said electric output of said pneumatic-electric switch and said probe transport means, said switching means coupled to be responsive to the relative position of said probes for a controlled disabling said electric output.

6. A system according to claim 5 in which there is provided means coupled to said sensing probe effecting change in the quantum of gas discharged from its said end, and said electric switching means is coupled to activate said charge effecting means.

7. A system according to claim 6 in which said probes are positioned such that the gas discharge from said sensing probe flows over said sampling probe end, and said change effecting means in combination with said transport means is constructed and arranged to significantly increase the gas discharge over the sampling probe end at such time when said probes are relatively distant from said surface.

8. A system according to claim 5 in which gas valve means is coupled upstream of said sensing probe and said gas valve means is electrically coupled to said electric output of said pneumatic-electric switch for closing said gas valve means during sampling by said sampling probe.

9. A system according to claim 1 in which said gas pressure responding means is coupled to said probe transport means for stopping probe relative movement during sampling.

10. A system according to claim 9 in which said sampling control means is coupled to said probe transport means for initiating probe relative movement.

11. A system according to claim 10 in which said sampling control means is coupled to said probe transport means for stopping probe relative movement at a time other than during sampling.

12. A system according to claim 1 in which said system includes switching means coupled to said probe transport means to be responsive to the relative position of said probes, gas quantum change effecting means are coupled between said gas source means and said sensing probe for responding to said switching means, and in which said probes are positioned such that the gas discharge from said sensing probe flows over said sampling probe end, and said change effecting means in combination with said transport means is constructed and arranged to increase significantly the gas discharge over the sampling probe end at such time when said probes are relatively distant from said surface.

13. A system according to claim 1 in which gas valve means is coupled between said gas source means and said sensing probe and is operable for being closed during sampling by said sampling probe.

* * * * *

UNITED STATES PATENT AND TRADEMARK OFFICE
CERTIFICATE OF CORRECTION

PATENT NO. : 3,894,438
DATED : July 15, 1975
INVENTOR(S) :

It is certified that error appears in the above-identified patent and that said Letters Patent are hereby corrected as shown below:

Column 1, line 11, after "herein" insert --to--; line 62, change "later" to --latter--. Column 2, line 51, after "sensing" change "the" to --probe--. Column 3, line 53, after "present" change "aliquot" to --near--. Column 4, line 10, change "clippard" to --Clippard--. Column 6, line 47, change "3" to --2--; line 63, change "charge" to --change--. Column 7, line 5, change "5" to --4--.

Signed and Sealed this twenty-eight Day of October 1975

[SEAL]

Attest:

RUTH C. MASON
*Attesting Officer*

C. MARSHALL DANN
*Commissioner of Patents and Trademarks*